No. 612,587. Patented Oct. 18, 1898.
T. S. GRIMES.
PNEUMATIC TIRE PUNCH.
(Application filed July 8, 1896.)
(No Model.)
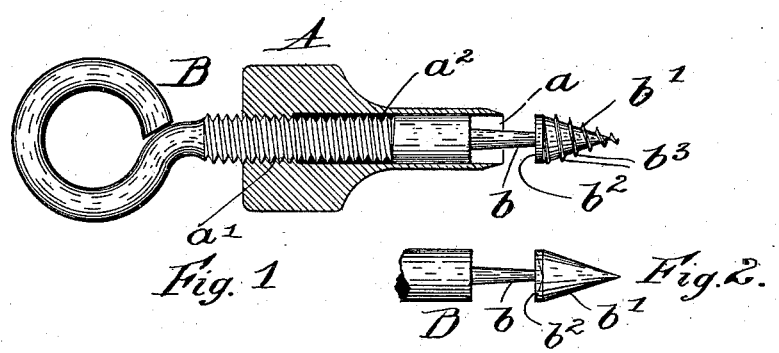
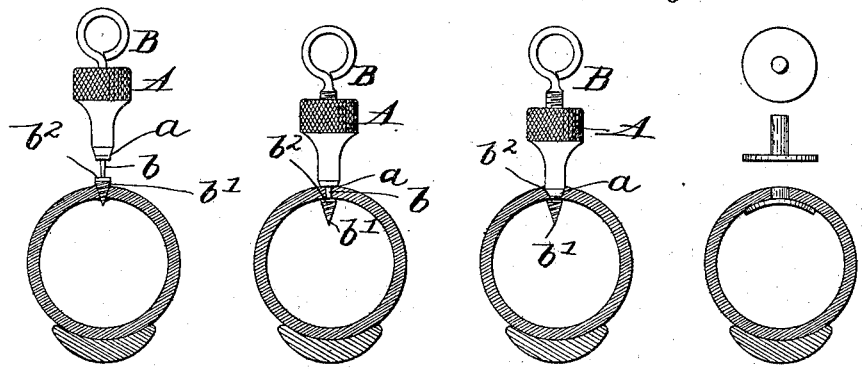
WITNESSES: J. M. Wood. Mary Logan.
INVENTOR Thaddeus S. Grimes,
BY A. A. Wood ATTORNEYS

UNITED STATES PATENT OFFICE.

THADDEUS S. GRIMES, OF ATLANTA, GEORGIA.

PNEUMATIC-TIRE PUNCH.

SPECIFICATION forming part of Letters Patent No. 612,587, dated October 18, 1898.

Application filed July 8, 1896. Serial No. 598,458. (No model.)

*To all whom it may concern:*

Be it known that I, THADDEUS S. GRIMES, a citizen of the United States of America, and a resident of Atlanta, in the county of Fulton and State of Georgia, have made a certain new and useful Invention of a Pneumatic-Tire Punch; and I hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to devices for repairing punctured pneumatic tires, the object of the invention being to remove a small circular piece of rubber from the tire, including the punctured portion, and thereby prepare a hole for the insertion of the rubber rivet, or, more properly speaking, rivet-like plate of rubber, which is pulled against and caused to adhere to the inner side of the tire, covering the rubber around the puncture.

In the accompanying drawings, Figure 1 is a longitudinal section of the device, showing the entering point screw-threaded on its conical surface. Fig. 2 is a modification showing the point with the screw-threads and capped on its abutting face. Fig. 3 is a detail view explanatory of the entering of the point. Fig. 4 shows the device in operative position in the tire, and Fig. 5 shows same in position as in cutting the tire. Fig. 6 is a sectional detail of the tire, showing the sealing-rivet in place and the operation of sealing the puncture completed. This figure also shows details of the rivet.

In the figures like reference characters indicate corresponding elements of construction in all the views.

As shown in Fig. 1, the device consists of a cylindrical longitudinal perforated barrel A, which is enlarged and preferably peripherally knurled on its back end and has its front or working end reduced in diameter, so as to provide for a cutting edge $a$, which is produced by beveling on the circumference of said reduced end. The longitudinal bore consists of a screw-threaded portion $a'$ and the counterbored portion $a^2$, which counterbore is of a size corresponding with the major diameter of the screw-threaded portion.

B is a screw-threaded plunger provided with a suitable finger-hold on one end and adapted to fit the counterbored portion of the barrel by a cylindrical portion, the screw-threads being adapted to enter and traverse the screw-threads of the said barrel. $b$ is a reduced portion of said plunger, and $b'$ is a conical entering point which may be either an integral portion of the plunger or said reduced portion, or may be secured to said reduced portion in any practicable manner. This point is the means by which the puncture is entered, and it is passed through the puncture, and then by drawing outwardly the face $b^2$ is brought into contact with the inner side of the tire and forms an abutment or punch against which the cutting is done and which by means of its peripheral corner may also cut, if desired. In order to make it cut with certainty and at the same time cause the hole cut to be cylindrical, by drawing the rubber toward its center it is made concave on its face, as shown in Fig. 2 by broken lines, and in order that a thick or stiff tire may be entered easily a spiral rib or screw-thread $b^3$ should be cut upon the periphery of the conical part $b'$.

The cylindrical portion of the plunger, fitting as it does the counterbore of the central bore of the barrel, forms a guide whereby the plunger and barrel are at all times kept concentric.

The operation of this device is as follows: The puncture is located and the conical point inserted therein and rotated until the screw-thread thereon causes the said point to pass through the tire by way of the puncture, whereupon the face $b^2$ of the point is pulled against the inner side of the tire. The barrel is then rotated in the direction which causes it to traverse the screw-threads toward, into, and through the said tire, its rotary motion causing it to cut the rubber and fabric, of which the tire is composed, freely. In cutting the tire is forced against the concave face $b^2$ of the conical point and the concave therein has a tendency to force the rubber centripetally thereof and prevents the compression caused by the cutting from making the hole spherical or tapering, causing a truly cylindrical hole to be cut. Into this hole from the outside is inserted the sealing-rivet, and cement is worked in upon the face of same through the opening around its stem, after which the projecting portion of the stem is cut off. The small plug of rubber cut from the hole will obviously be drawn into the barrel, from which it may be very readily forced by reversing the rotation of the barrel and screwing it backwardly upon the screw-threaded stem until the shoulder between said screw-threaded stem and the reduced portion thereof forces the said plug from the barrel, when it will then be easily removed with the fingers.

Having thus described my invention, what I claim as new, and desire to secure by Letters Patent of the United States, is—

A punch device for preparing the holes in bicycle-tires for repairs comprising the following elements: a pointed punch adapted to be forced through the tire, a stem and a reduced portion on said stem between same and the punch whereby a shoulder is formed between said stem and reduced portion, a cylindrical die through which such stem moves, and into which the punch is adapted to be drawn, and means to operate the punch in such manner that it may be drawn into the die to cut or shear the hole.

In testimony whereof I hereunto affix my signature in presence of two witnesses.

THADDEUS S. GRIMES.

Witnesses:
A. P. WOOD,
S. M. WOOD.